Feb. 2, 1971  JEAN-CLAUDE BEUCHAT  3,559,462
APPARATUS FOR CHECKING WATERPROOFNESS, ESPECIALLY
THAT OF TIMEPIECE CASES
Filed April 23, 1969
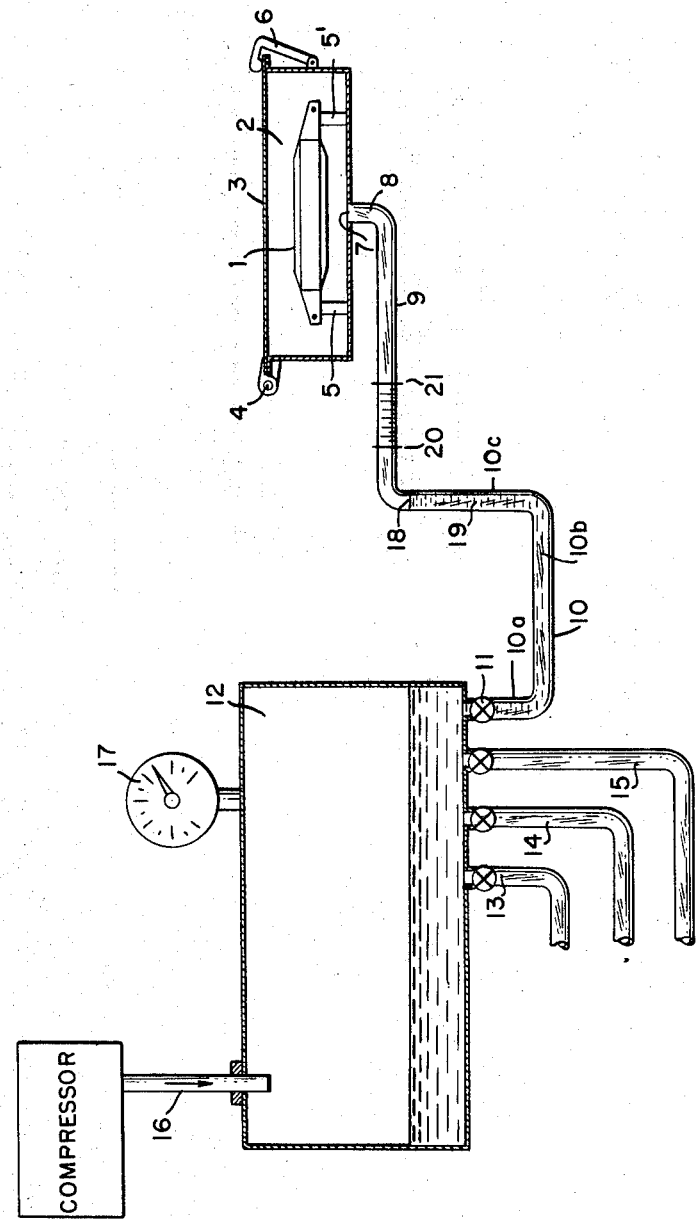

United States Patent Office 3,559,462
Patented Feb. 2, 1971

3,559,462
APPARATUS FOR CHECKING WATERPROOFNESS, ESPECIALLY THAT OF TIMEPIECE CASES
Jean-Claude Beuchat, 48 Avenue Blanc, Geneva, Switzerland
Continuation-in-part of application Ser. No. 632,990, Apr. 26, 1967. This application Apr. 23, 1969, Ser. No. 818,772
Claims priority, application Switzerland, May 13, 1966, 6,948/66
Int. Cl. G01m 3/02
U.S. Cl. 73—49.3      2 Claims

ABSTRACT OF THE DISCLOSURE

An apparatus for testing the leakage of sealed containers, particularly that of watch cases is described. The case is placed in an airtight enclosure of known volume, which is subjected to a predetermined pressure. A liquid level gauge, in communication with the enclosure indicates the extent of penetration of the pressurized atmoshere surrounding the test sample and consequently, the conditions of leakage.

---

This application is a continuation in part of my copending application, Ser. No. 632,990, now abandoned filed Apr. 24, 1967.

This invention relates to an apparatus and method for determining the leakproofness of relatively small sealed enclosures, such as watch-cases, which are so constructed as to be waterproof.

Various methods and apparatus have been suggested for determining the leakproof quality of watch-cases. In a sense these operate on applying pressure in a sealed environment to the cases and observing or recording the pressure change due to acceptance of some of the pressurized atmosphere by the object under tests. Use has been made, also, of manometric indications of liquid level changes in a constrained sealed passage first by balancing the level prior to test to indicate the state of normal conditions and then by manipulation of inflow and outflow valves indicate the conditions existing in the device to be tested.

In accordance with the invention, the above outlined basic concepts have been adopted in principle. However, the apparatus, as it will be seen, eliminates the cumbersome manipulating procedures and presents a simple embodiment requiring minimum time and skill in its operation.

It is accordingly, a primary objection of this invention to provide an apparatus for testing the leakproofness, or in other words, the water-tight condition of watch cases.

It is a particular feature of the invention that the condition of leak tightness of the object is readily observable during test procedure.

A particular advantage of the invention is that the construction of the apparatus is extremely simple and in use requires the manipulation of only a single valve during test procedure.

Other objects, features and advantages will be apparent from the following description of the invention, pointed out in particularity in the appended claims, and taken in connection with the accompanying drawing in which:

The single figure is a schematic representation of the apparatus.

Referring to the drawing, the watch case 1 under test is deposited in an enclosure 2 which is substantially airtight and is capable of sustaining pressure far in excess the pressure to be applied. By way of illustration, it is shown that the enclosure 2 has a cover 3 hinged at 4 in order to give access for depositing the watch case 1 over suitable supports 5 and 5'. A clamp 6 or other equipment fastening means may be provided to hold the cover 3 solidly for the purpose of maintaining the enclosure 2 airtight for the test.

The enclosure 2 has a communicating outlet 7 connected to a conduit 8 which is at least partially transparent and has a horizontal portion 9 terminating in an U-shaped structure 10 having vertical portions 10a and 10c connected by a horizontal portion 10b. Calibration markers 20 and 21 are provided on the horizontal portion 9 of the conduit 8.

The upper end of the vertical portion 10a of the U-shaped portion 10 is connected by means of a shut-off valve 11 to the bottom of a pressurizing tank 12 which is partially filled with a liquid medium 19. It is to be noted that the tank 12 is so placed in relation to the horizontal portion 9 of the conduit 8 as to allow the establishment of a liquid level, the meniscus 18 of which is near to, but not exceeding the top of the vertical portion 10c of the U-shaped configuration 10.

Obviously, as seen from the illustration, the enclosure 3 is also above this liquid level. The tank 12 may have several outlets as shown in 13, 14 and 15 to serve at the same time other test enclosures similar to the one illustrated here.

A compressor shown in block diagram connected by a conduit 16 to the tank 12 provides the required pressurizing, the extent of which may be read by the gauge 17.

In the operation of the apparatus, the watch case 1 to be tested, is placed in the enclosure 2 and the cover 3 is securely fastened.

The tank 12 is under given pressure indicated by the gauge 17. The required pressure is determined by the type of test piece under consideration. The valve 11 is now opened and an observation is made on the meniscus 18 of the liquid 19. A certain time is allocated for each particular test. The meniscus 18 may reach the marker 20 on the horizontal portion 9 of the conduit 8 due to the compression of the air in the enclosure 3 which may be considered as a normal condition. However, if, as time passes, the meniscus 18 creeps towards the limit marker 21 it indicates that air is entering into the confines of the watch case 1. Subdivisions placed between the two markers, 20 and 21 will indicate in finer detail the degree of permeability of the watch case under test from which the waterproof quality of the watch case can easily be determined.

What is claimed is:
1. Apparatus for determining the leakage of watertight enclosures particularly that of watch cases which comprises; a substantially airtight test enclosure of known volume adapted to sustain a pressure gradient above that of the applied pressure, said enclosure having means for supporting therein a test sample such as a watch case, a tank partially filled with a liquid medium, a gas compressor and a pressure gauge connected to said tank, a communicating conduit at least partially transparent between said tank and said enclosure, having such configuration as to permit the observation of the liquid level therein, said conduit being the sole communication between said test enclosure and said tank, said enclosure being placed above the liquid level in said tank, whereby upon application of gas pressure to said tank the change in liquid level in said conduit in a given time serves as a measure of determining the extent of leakage of the sample under test.

2. Apparatus in accordance with claim 1 wherein said communicating conduit has a U-shaped configuration having a vertical portion and a horizontal extension bearing graduation markers defining the limit of liquid flow correlated to the leakage in said test sample.

References Cited

UNITED STATES PATENTS

| | | | |
|---|---|---|---|
| 2,401,368 | 6/1946 | O'Connell et al. | 73—49.3 |
| 2,853,874 | 9/1958 | Mennesson | 73—40 |
| 3,340,723 | 9/1967 | Harris et al. | 73—40 |
| 3,355,932 | 12/1967 | Mulligan | 73—49.3 |

LOUIS R. PRINCE, Primary Examiner

W. A. HENRY, Assistant Examiner